(12) United States Patent
Mallya et al.

(10) Patent No.: US 10,021,515 B1
(45) Date of Patent: Jul. 10, 2018

(54) METHOD AND SYSTEM FOR LOCATION ESTIMATION

(71) Applicant: Oracle International Corporation, Redwood Shores, CA (US)

(72) Inventors: Aniruddha Mallya, Belmont, CA (US); Padma Subramanian, Mountain View, CA (US); Jee Yeon Hwang, Foster City, CA (US); Kishan Agrawal, Fremont, CA (US); Manoj Devasarma, Pleasanton, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 15/404,519

(22) Filed: Jan. 12, 2017

(51) Int. Cl.
*H04W 4/02* (2018.01)
*H04W 4/80* (2018.01)
*H04W 4/00* (2018.01)

(52) U.S. Cl.
CPC ............ *H04W 4/02* (2013.01); *H04W 4/008* (2013.01); *H04W 4/80* (2018.02)

(58) Field of Classification Search
CPC ................................ H04W 4/02; H04W 4/008
USPC ......... 455/404.2, 414.1, 414.2, 456.3, 456.2, 455/422.1, 456.1; 340/7.27, 539.2
See application file for complete search history.

(56) References Cited

U.S. PATENT DOCUMENTS

| | | | | |
|---|---|---|---|---|
| 2005/0243784 | A1* | 11/2005 | Fitzgerald | G06Q 30/00 370/338 |
| 2013/0166198 | A1* | 6/2013 | Funk | G01C 21/165 701/446 |
| 2015/0264535 | A1* | 9/2015 | Mak | H04W 4/043 455/456.1 |
| 2016/0003949 | A1* | 1/2016 | Venkataraman | G01S 19/22 342/357.29 |
| 2016/0021511 | A1* | 1/2016 | Jin | H04W 4/04 455/457 |
| 2016/0216117 | A9* | 7/2016 | Bandyopadhyay | G01C 17/38 |
| 2016/0374045 | A1* | 12/2016 | Pandharipande | G01S 1/68 |
| 2016/0379074 | A1* | 12/2016 | Nielsen | G06K 9/3241 348/143 |
| 2017/0055112 | A1* | 2/2017 | Westphal | H04W 4/02 |
| 2018/0025603 | A1* | 1/2018 | Tyler | G08B 13/2462 |

* cited by examiner

*Primary Examiner* — Inder Mehra
(74) *Attorney, Agent, or Firm* — Invoke

(57) ABSTRACT

A method includes configuring a physical environment with Bluetooth Low Energy (BLE) beacons where a transmit power of the BLE beacons is selected such that (a) wireless devices at particular physical zones within the physical environment receive Bluetooth signals from respective BLE beacons, and (b) physical zones corresponding to BLE beacons are separated by non-BLE-zones. A method includes determining that a wireless device is not located within any physical zones corresponding to BLE beacons, and in response, (a) identifying a last physical zone in which the wireless device was located, (b) determining a trajectory of the wireless device subsequent to detection in the last physical zone, and (c) estimating the location of the wireless device based on the last physical zone in which the wireless device was detected and the trajectory of the wireless device since the detection in the last physical zone.

19 Claims, 6 Drawing Sheets

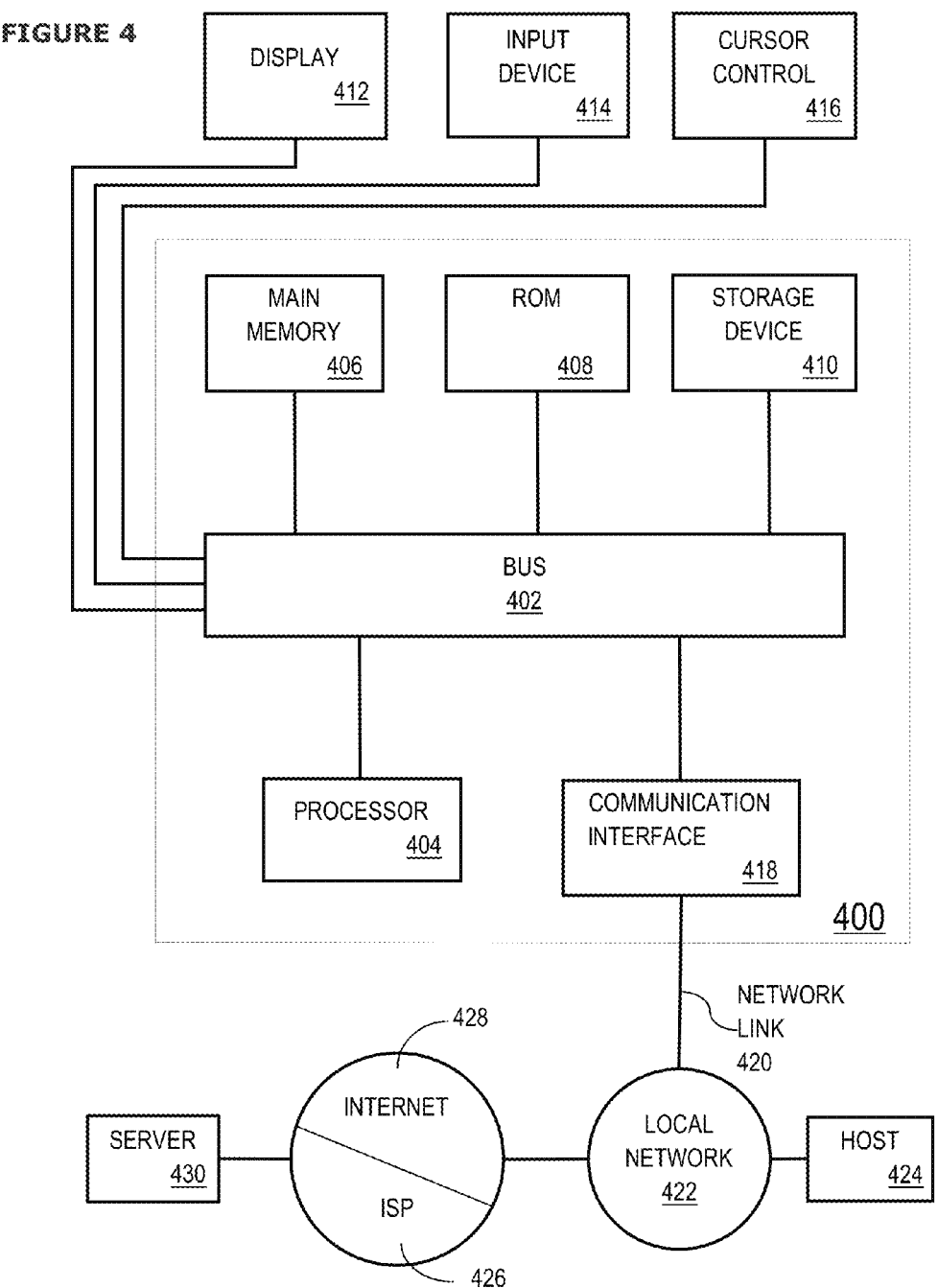

METHOD AND SYSTEM FOR LOCATION ESTIMATION

TECHNICAL FIELD

The present disclosure relates to determining a location of a wireless device.

BACKGROUND

Bluetooth is a global wireless communication standard that is used for communication between Bluetooth enabled devices. Bluetooth technology may be used for exchanging data over short distances (e.g., using short-wavelength UHF radio waves in the ISM band from 2.4 to 2.485 GHz) from fixed and mobile devices, and building Personal Area Networks (PANS).

Among the various Bluetooth technologies, Bluetooth Low Energy (BLE) is a wireless personal area network technology. BLE may also be referred to, for example, as Bluetooth LE, or Bluetooth Smart. BLE is designed and marketed by the Bluetooth Special Interest Group. BLE is aimed at novel applications in the healthcare, fitness, beacons, security, and home entertainment industries. Compared to Classic Bluetooth, Bluetooth Smart is intended to provide considerably reduced power consumption and cost than Classic Bluetooth while maintaining a similar communication range as Classic Bluetooth. A detection device may "ping" surrounding devices using BLE signals. In response to receiving a BLE signal, a receiving device may respond with an identifier (e.g., a Media Access Control address) used to identify and/or locate the receiving device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 illustrates a system in accordance with one or more embodiments.

DETAILED DESCRIPTION

Figure 1:
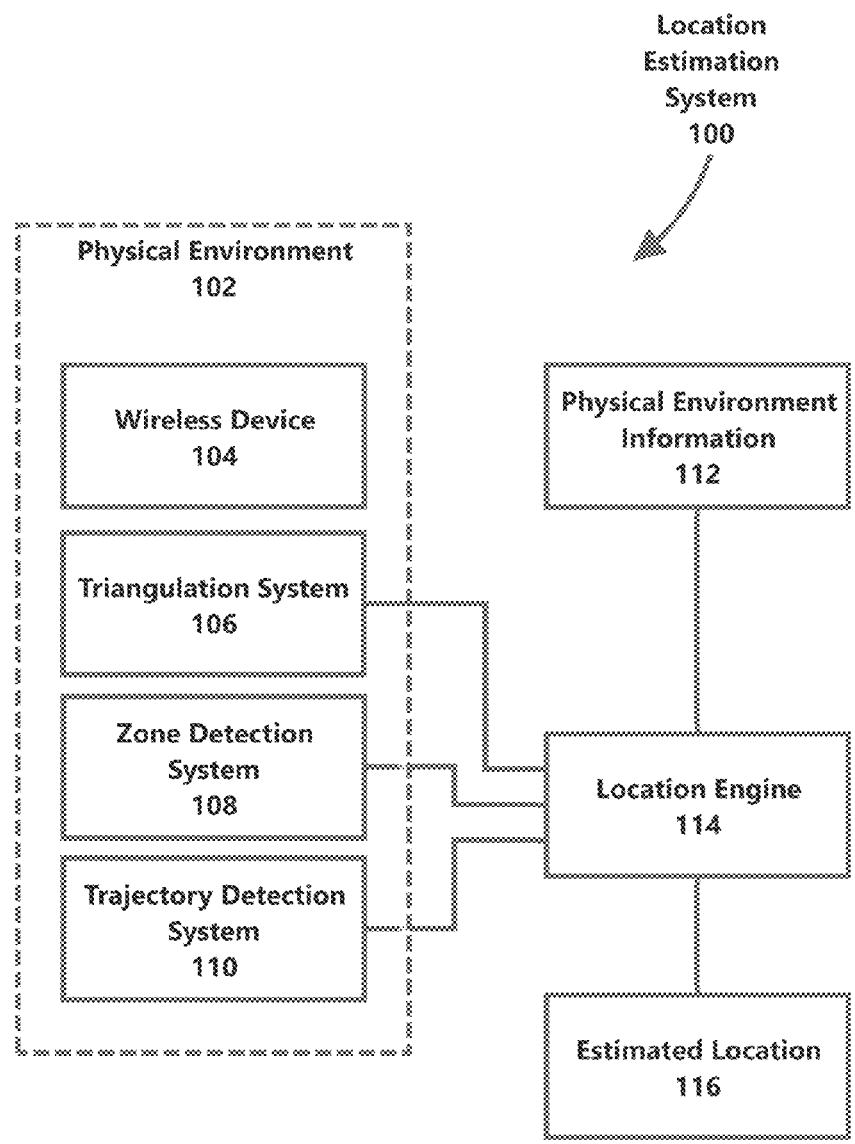
FIG. 1 illustrates components of a location estimation system in accordance with one or more embodiments.

In the following description, for the purposes of explanation, numerous specific details are set forth in order to provide a thorough understanding. One or more embodiments may be practiced without these specific details. Features/components described in one embodiment may be combined with features/components described in a different embodiment. In some examples, well-known structures and devices are described with reference to a block diagram form in order to avoid unnecessarily obscuring the present invention.

GENERAL OVERVIEW

One or more embodiments include estimating a location of a wireless device. As an example, a physical environment is configured with a set of Bluetooth Low Energy (BLE) beacons. One or more of the BLE beacons corresponds to a respective physical zone within the physical environment. A wireless device, located within a physical zone corresponding to a BLE beacon, receives Bluetooth signals transmitted by the BLE beacon. A location engine may use information corresponding to the Bluetooth signals, received by the wireless device, to identify the BLE beacon that transmitted the Bluetooth signals. Furthermore, the location engine may determine that the physical zone, corresponding to the identified BLE beacon, is the location of the wireless device. Components of the location engine may be implemented on the wireless device itself, and/or implemented on a separate device.

In at least one embodiment, a transmit power of Bluetooth signals transmitted by BLE beacons within a physical environment are selected such that decipherable Bluetooth signals may only be received from a single BLE beacon at any location within the physical environment. Bluetooth signals transmitted by a BLE beacon do not reach the physical zones corresponding to other BLE beacons with a sufficient power level to be decipherable. Accordingly, the respective physical zones corresponding to BLE beacons may be non-overlapping physical zones.

In an embodiment, a current location of wireless device is determined by combining a Bluetooth-based physical zone determination and a trajectory determination. When a location engine (which may be implemented on the wireless device itself) determines that the wireless device is not located in any of the physical zones corresponding to BLE beacons, the location engine identifies a last physical zone in which the wireless device was detected. The location engine further identifies a trajectory of the wireless device subsequent to detection in the last physical zone. The trajectory may include a direction and a distance of movement. The location engine estimates the current location of the wireless device based on the last detected physical zone and the trajectory since the detection of the wireless device in the last detected physical zone. Specifically, the location engine applies the trajectory to a location corresponding to the last detected physical zone, in view of the physical environment, to estimate the current location of the wireless device.

One or more embodiments include selecting, at runtime, a mechanism to estimate a location of a wireless device. As an example, a location engine (which may be implemented on the wireless device itself) may include functionality to estimate a location of the wireless device using multiple different mechanisms. A first mechanism may include triangulation based on Wi-Fi signals transmitted or received by the wireless device. A second mechanism may include detection of the wireless device using Bluetooth Low Energy (BLE) beacons. A particular mechanism may be preferred over another mechanism in different sections of a physical environment. As an example, an open space within a warehouse may be suitable for location estimation using Wi-Fi based triangulation. A space with a multitude of physical obstructions, such as aisles with cargo that may block Wi-Fi signals, may be suitable for zone-based location estimation using BLE beacons. A location engine switches between using the zone-based location estimation with BLE beacons and using Wi-Fi based triangulation. The location engine may be configured to select a mechanism based on the signals received and/or transmitted by the wireless device. The location engine may be configured to select a mechanism based on a level of confidence associated with a respective location estimation mechanism. The location engine may be configured to select a mechanism based on the characteristics of the physical environment in which the wireless device is located.

A. Location Estimation System

FIG. 1 illustrates a block diagram example of a location estimation system 100. The block diagram example of the location estimation system 100 includes different types of components in accordance with one or more embodiments. The example of system 100, as illustrated in FIG. 1, includes a wireless device 104, a triangulation system 106, a zone detection system 108, a trajectory detection system 110, and a location engine 114. In one or more embodiments, system 100 may include more or less components than the components illustrated in FIG. 1. Two or more components within system 100 may be communicatively coupled via a local area network, a wide area network, the internet, an intranet, a cellular network, and/or combinations thereof.

Multiple components within system 100 may be implemented on the same digital device. For example, the location engine 114 may be implemented on the wireless device 104. A component within system 100 may correspond to a single digital device or implemented across multiple digital devices. The term "digital device" generally refers to any hardware device that includes a processor. Examples of digital devices include a computer, a tablet, a laptop, a desktop, a netbook, a cellular phone, a television, a monitor, a content receiver, a set-top box, a streaming stick, a video gaming console, a mobile handset, a smartphone, a personal digital assistant "PDA", a Bluetooth enabled device, a Bluetooth Low Energy (BLE) transmitter, a wireless receiver and/or transmitter, an access point, a base station, a communication management device, a router, a switch, and/or a controller. One type of digital device, as described above, includes a wireless device (e.g., wireless device 104). A wireless device includes any digital device configured for wireless communication. As an example, a wireless device may include a cellular phone, a tablet, a laptop, an optical head-mounted display device, a hand-held radio transmitter, or any other device configured for wireless communication.

Some components of the system 100 may be within a same physical environment while other components may be outside of that physical environment. The example of system 100, as illustrated in FIG. 1, includes a wireless device 104, a triangulation system 106, a zone detection system 108, and a trajectory detection system 110 within a same physical environment 102. Other components (e.g., location engine 114) may also be located within the same physical environment 102 or outside of the physical environment 102. As an example, at least one component of the location engine 114 may be implemented on a web server remotely located from the physical environment 102.

The physical environment 102, as referred to herein, may include any physical space in which a wireless device may be physically located. Examples of the physical environment 102 include, but are not limited to, a warehouse, a hospital, a grocery store, a mall, a department store within a mall, an office building, a park, a sports stadium, and a car dealership. Different sections of a physical environment 102 may have different wireless communication characteristics. As an example, a warehouse may include a first section with high metal aisles loaded with cargo. Wireless devices within the first section may have a poor Wi-Fi connectivity with access points within the warehouse. The aisles may block Wi-Fi signals from reaching the wireless devices within the first section. The first section may be configured with a set of Bluetooth Low Energy (BLE) beacons. The BLE beacons may be installed within each aisle. The BLE beacons may be able to effectively transmit Bluetooth signals to wireless devices within respective aisles.

In an embodiment, the triangulation system 106 includes hardware and/or software for estimating a location of the wireless device 104 using triangulation techniques. Any known or to-be-developed triangulation techniques may be used by the triangulation system 106 to triangulate a location of the wireless device 104. As an example, the triangulation system includes three or more access points which include functionality to detect Wi-Fi signals from the wireless device 104. Based on the strength of the received wireless signals, the triangulation system 106 (or location engine 114) determines a distance between the wireless device 104 and each of the access points. Furthermore, the location engine 114 estimates a location of the wireless device 104 based on the distance of the wireless device 104 from each of the access points.

In an embodiment, a zone detection system 108 includes hardware and/or software for detecting the wireless device 104 within a particular physical zone of the physical environment 102.

In an embodiment, the zone detection system 108 includes a set of BLE beacons. Each BLE beacon may be associated with a corresponding physical zone. Wireless devices within a physical corresponding to a BLE beacon receive decipherable Bluetooth signals from that BLE beacon. Decipherable Bluetooth signals include Bluetooth signals with a received signal strength above a threshold value. As an example, a BLE beacon periodically broadcasts Bluetooth signals (e.g., every 100 ms) that may be received by the wireless device 104, if the wireless device 104 is within the physical zone corresponding to the BLE beacon. The wireless device 104 may transmit information corresponding to the received Bluetooth signal (e.g., a source of the Bluetooth signals) to a location engine implemented on the wireless device 104 itself or separate from the wireless device 104. The location engine may determine the physical zone associated with a source BLE beacon as a location of the wireless device 104.

In an embodiment, a wireless device detects Bluetooth signals from multiple BLE beacons corresponding to a same particular physical zone. The number of BLE beacons, from which the wireless device detected Bluetooth signals, may be used to determine a confidence value for determining that the wireless device is located within the particular physical zone.

In an embodiment, the zone detection system is based on Wi-Fi fingerprinting techniques. Fingerprinting techniques may generate a signature for a known location based on (a) signals received from network devices by a wireless device at the known location, or (b) signals received by network devices from a wireless device at the known location. As an example, a wireless device, while in a particular physical zone, receives Wi-Fi signals from four different access points at fixed locations. The characteristics of the received signals are stored as a signature for the particular physical zone. Other devices may be determined to be at the same particular physical zone if the other devices detect signals with the same characteristics as the signature for the particular physical zone.

In an embodiment, a trajectory detection system 110 includes software and/or hardware that includes functionality to determine a trajectory of a wireless device 104. The trajectory of the wireless device 104 may include a direction and distance of movement of the wireless device 104 within the physical environment 102. The trajectory of the wireless device 104 may be determined with respect to the physical environment. The wireless device 104 may be moved into and out of the physical zones recognized by a zone detection system 108.

In an embodiment, a trajectory detection system 110 includes a pedometer implemented on the wireless device 104 itself. The data collected by the pedometer is used to determine a distance of the movement of the wireless device 104. The wireless device 104 may transmit the distance information to the location engine 114. The trajectory detection system 110 may further include a magnetometer implemented on the wireless device 104. The data collected by the magnetometer is used to determine a direction of movement of the wireless device 104. The wireless device 104 may transmit data identifying the direction of movement to the location engine 114.

In an embodiment, the location engine 114 includes hardware and/or software to estimate a location ("estimated location 116") of the wireless device 104. The location engine 114 may receive information from the triangulation system 106, zone detection system 108, trajectory detection system 110, and/or any other component of the location estimation system 100. The location engine 114 may be implemented on the wireless device 104, a separate network device, or a combination thereof.

In an embodiment, the location engine 114 includes functionality to use the data received from one system while discarding data received from another system. As an example, the location engine 114 may receive information from both the triangulation system 106 and the zone detection system 108. Responsive to determining that the information received from the zone detection system 108 is associated with a confidence level above a threshold value, the location engine 114 may discard the information received from the triangulation system. The location engine 114 may estimate the location of the wireless device 104 based on the information received from the zone detection system 108.

In an embodiment, the location engine 114 receives physical environment information 112. The location engine 114 may estimate a location of the wireless device 104 with respect to the physical environment 112. As an example, the location engine 114 may determine that a wireless device 103 is located in aisle ten of a grocery store. The location engine 114 may estimate the location based, in part, on the existence of a path from a previously known location of the wireless device 104 to the estimated location.

B. Estimating a Location of a Wireless Device in a Physical Environment

Figure 2:
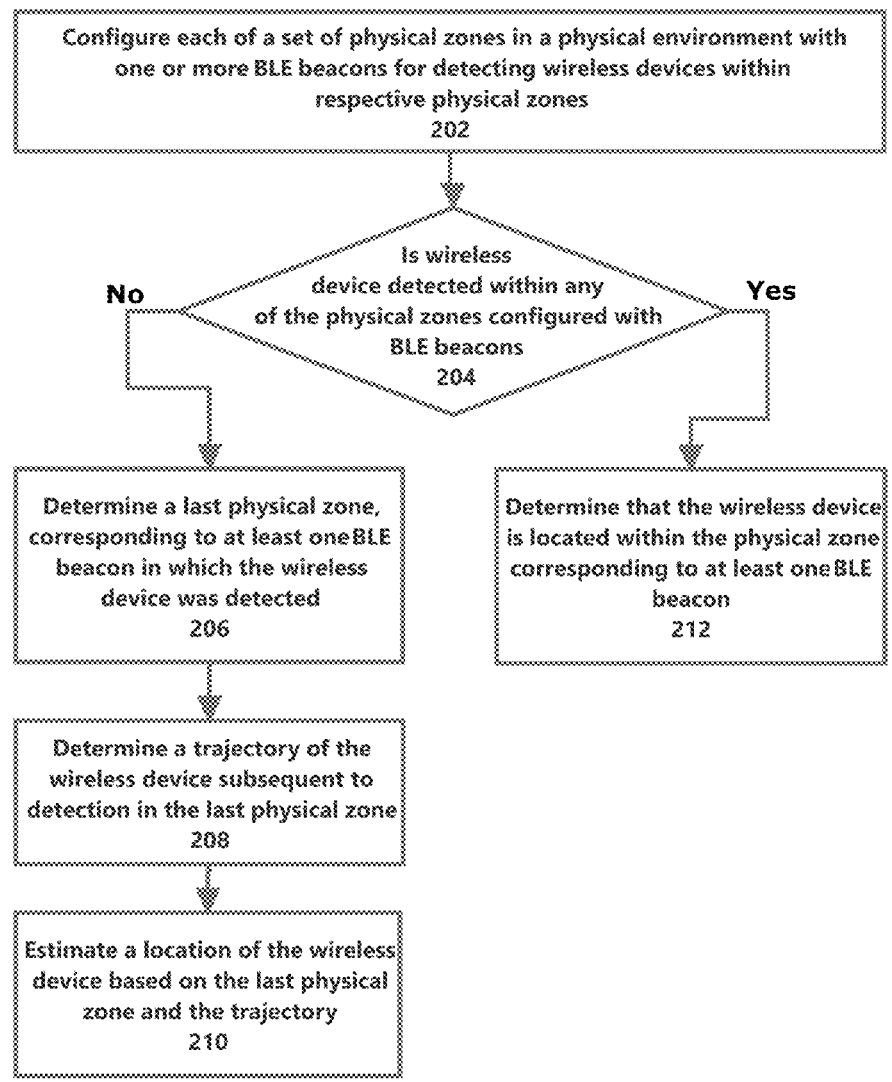
FIG. 2 illustrates operations for estimating a location of a wireless device in accordance with one or more embodiments.

FIG. 2 includes an example set of operations for estimating a location of a wireless device in a physical environment. Other operations not described herein may be used instead and/or in addition to the described operations. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments include configuring each of a set of physical zones in a physical environment with one or more BLE beacons (Operation 202). The BLE beacons are configured to detect wireless devices within respective physical zones.

An embodiment includes configuring the physical environment such that BLE-configured physical zones are separated from each other by non-BLE-configured spaces. Accordingly, spaces between different BLE-configured physical zones have no BLE beacons for Bluetooth signal coverage. Wireless devices located within BLE-configured physical zones receive decipherable Bluetooth signals from at least one respective BLE beacon. Decipherable Bluetooth signals correspond to Bluetooth signals with a received signal strength above a threshold value. Wireless devices located in non-BLE-configured spaces do not receive any decipherable Bluetooth signals from any of the BLE beacons. The size of the physical zones corresponding to BLE beacons may be a function of the transmit power used by the BLE beacons. Configuring the physical environment to include non-BLE-configured spaces between BLE-configured physical zones may involve adjusting the transmit power used by BLE beacons. The transmit power is adjusted such that coverage holes are intentionally created between the BLE-configured physical zones. Decipherable Bluetooth signals from a BLE beacon do not reach physical zones corresponding to other BLE beacons.

In an embodiment, the location engine receives a request to track a wireless device. As an example, the location engine may receive a request from a factory manager to determine a location of an employee by tracking the employee's cell phone within a factory. Alternatively, the location engine may continually track a wireless device. As an example, a location engine may continually track a warehouse worker's smart phone to continually update a route for the warehouse worker to complete a set of tasks.

The location engine may perform a check to determine whether the wireless device to-be-located is detected within any of the physical zones configured with BLE beacons (Operation 204). Determining whether the wireless device is located within any of the physical zones configured with BLE beacons includes determining whether the wireless device is receiving Bluetooth signals periodically transmitted by any of the BLE beacons. If the wireless device is located within a Bluetooth communications range of the BLE beacons (i.e., located in a physical zone of one of the BLE beacons), then the wireless device receives the Bluetooth signals transmitted by at least one of the BLE beacons. The location engine may determine, based on Bluetooth signals received by the wireless device, that the wireless device is located within a physical zone corresponding to at least one BLE beacon (Operation 212). The physical zone corresponding to a BLE beacon may include, for example, a particular isle in a warehouse.

Alternatively, the wireless device may not be in one of the physical zones configured with BLE beacons. If the wireless device is not in one of the physical zones configured with BLE beacons, the wireless device will not receive decipherable Bluetooth signals from any of the BLE beacons. The location engine then determines a last physical zone, configured with at least one BLE beacon, in which the wireless device was detected (Operation 206). As an example, a mall may be configured with BLE beacons within each department store. A shopper, Julie has a cell phone that is tracked using BLE beacons that periodically ping Julie's cell phone. The location engine of the cell phone determines that the cell phone is located within the physical zone of the BLE beacon from which the Bluetooth signals were detected. At a time x, Julie's cell phone does not receive Bluetooth signals from any of the BLE beacons. Julie's cell phone was last detected at the entrance of Kacy's department store via Bluetooth signals received from BLE beacons installed at the entrance to Kacy's department store. The entrance to Kacy's department store is identified as a last physical zone in which Julie's cell phone was detected.

In an embodiment, the trajectory detection system transmits trajectory information to the location engine. The trajectory information includes a trajectory of a wireless device subsequent to detection of the wireless device in a last physical zone corresponding to at least one BLE beacon (Operation 208).

Continuing the above example, a magnetometer and a pedometer implemented on Julie's cell phone collects trajectory information. At least a subset of the trajectory system corresponding to a trajectory of Julie's cell phone, subsequent to detection of Julie's cell phone at the entrance of Kacy's, is transmitted to the location engine. The trajectory information indicates both a direction and a distance of movement of Julie's cell phone. The trajectory information indicates that Julie's cell phone was moved twenty meters to the east since detection of Julie's cell phone at the entrance of Kacy's department store.

In an embodiment, the location engine estimates a location of a wireless device based on (a) a last physical zone in which the wireless device was detected and (b) a trajectory since the detection in the last physical zone (Operation 210). The location engine may further use information about the physical environment to estimate the location of a wireless device.

Continuing the above example, the location engine estimates a location of Julie's cell phone. The location engine estimates the location based on (a) the last detection of Julie's cell phone at the entrance of Kacy's department store and (b) the trajectory indicating movement twenty meters in an eastward direction subsequent to detection at the entrance of Kacy's department store. The estimate is further based on a map of the mall ("environment information") indicating that two paths from Kacy's department store are available to users. A first path goes eastward towards Uncle Sam's Pretzels which is twenty meters east of the entrance to Kacy's department store. A second path goes northward towards Tina's Jewels which is ten meters north of the entrance to Kacy's department store. The location engine determines Julie's cell phone is twenty meters east of the entrance to Kacy's department store. The location engine further determines that Julie's cell phone is in front of Uncle Sam's Pretzels based on the map of the mall. Based on the estimated location of Julie's cell phone as determined by the location engine, a coupon for Uncle Sam's Pretzels may be transmitted to Julie's cell phone.

Figure 3A:
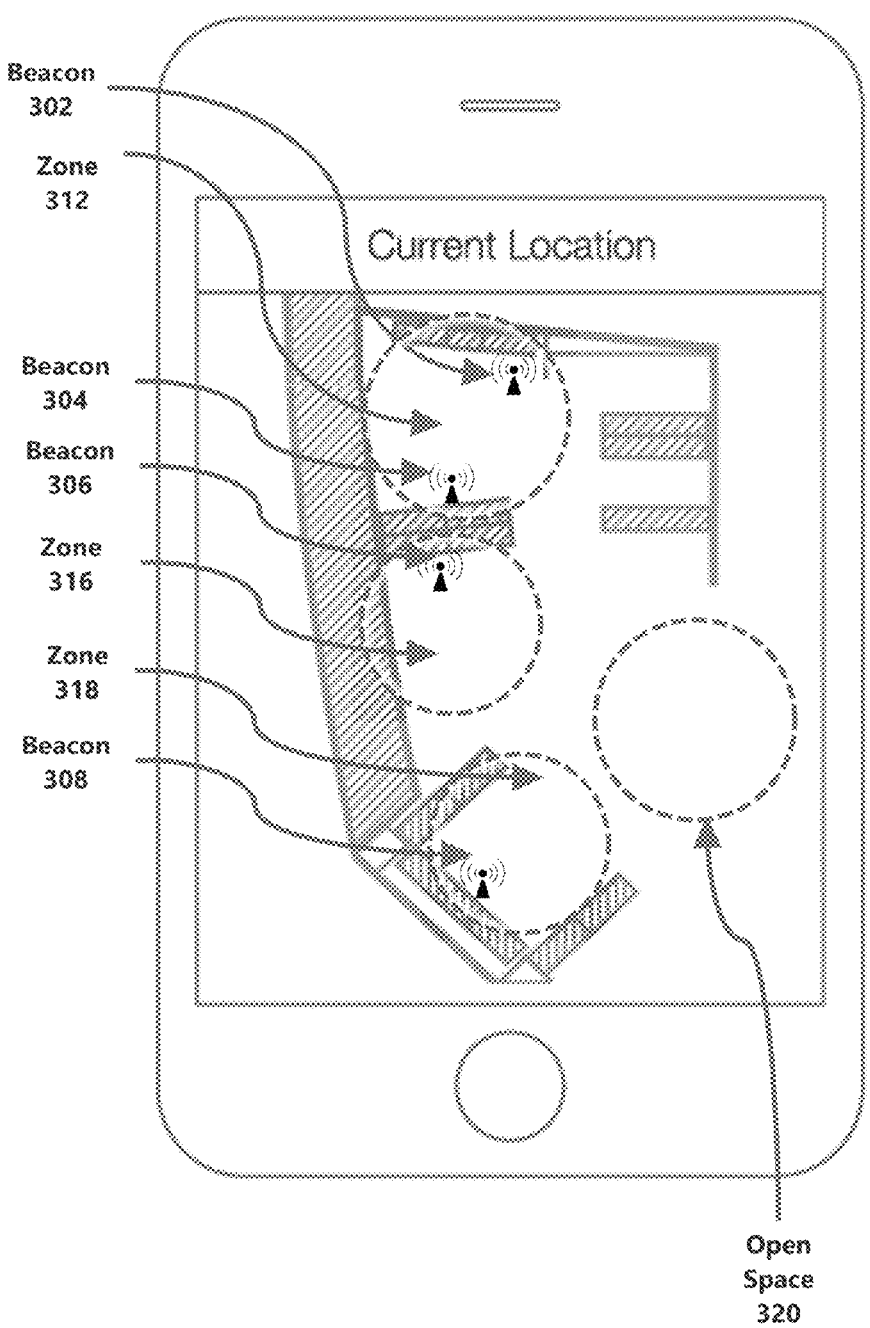
FIGS. 3A-3C illustrate an example in accordance with one or more embodiments.
Figure 3B:
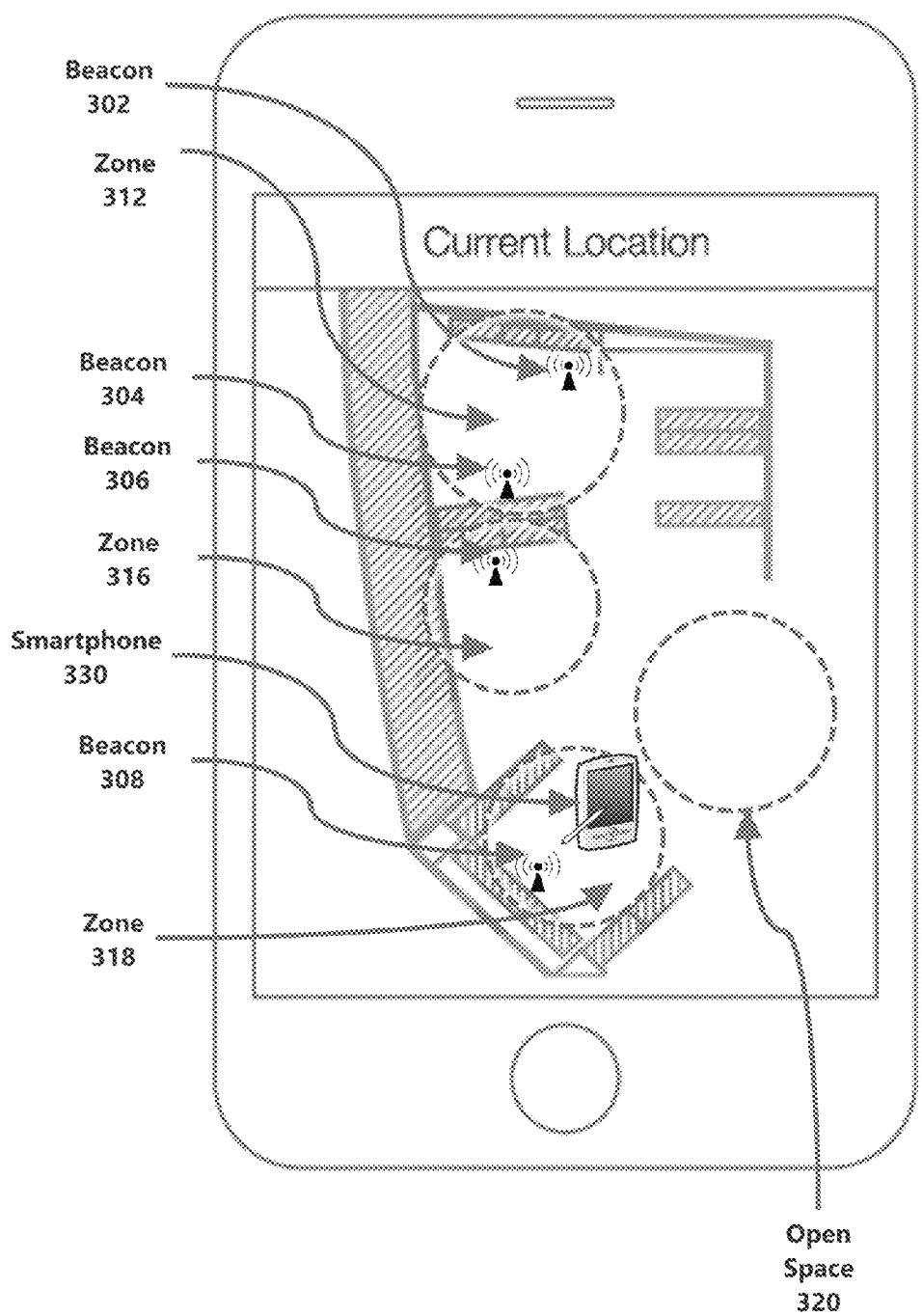
Figure 3C:
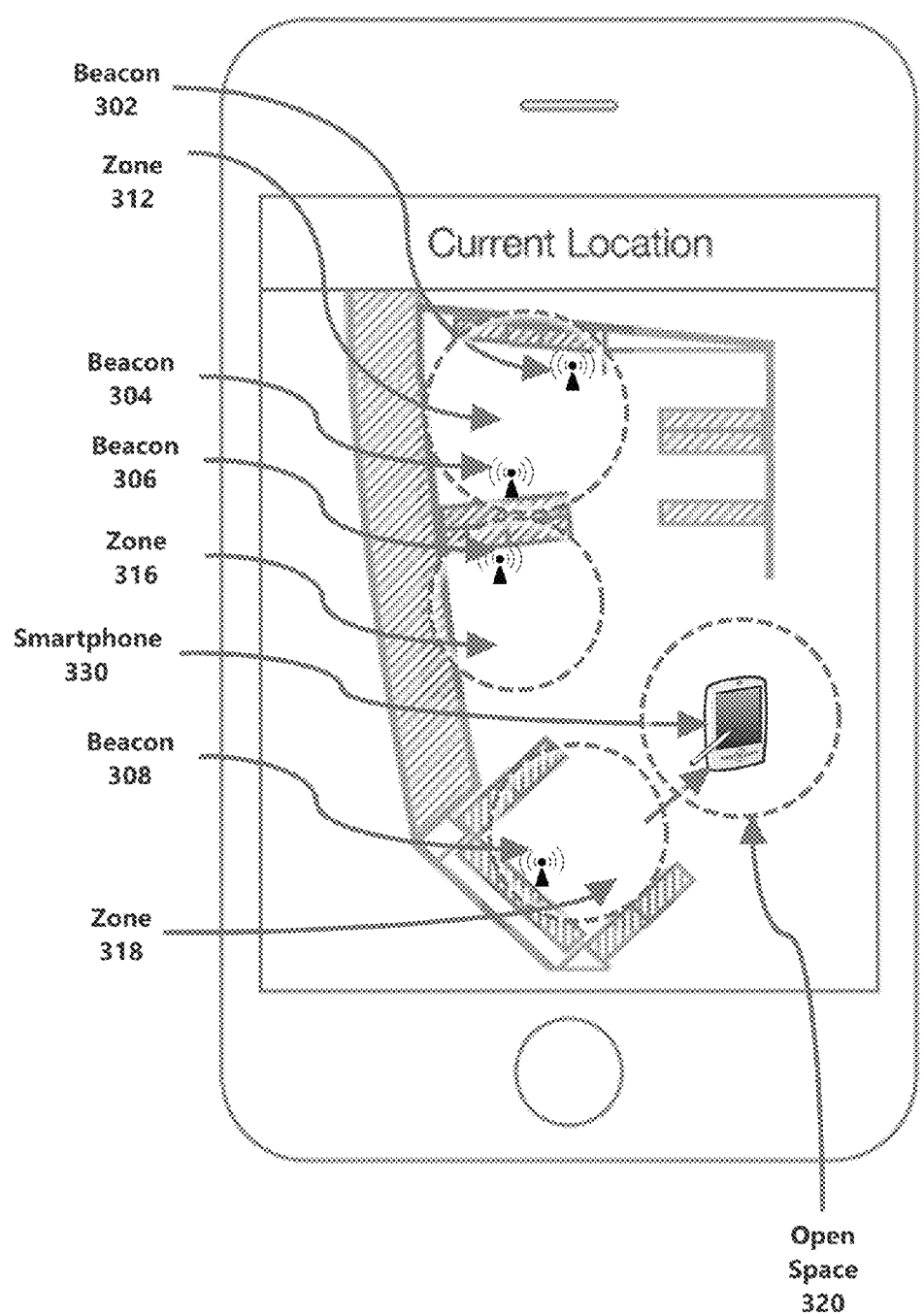

FIGS. 3A-3C illustrate an example in accordance with one or more embodiments. Specifically, FIGS. 3A-3C relate to identifying the location of an employee in a company warehouse. The location of the employee is assumed to be the same as the location of the employee's smartphone that is being tracked by a location engine.

FIG. 3A illustrates BLE beacons (e.g., beacon 302, beacon 304, beacon 306, and beacon 308) installed in a warehouse. Beacon 302 and beacon 304 correspond to a same physical zone 312. Accordingly, devices detecting Bluetooth signals from either of beacon 302 or beacon 304 are determined to be within physical zone 312. Beacon 306 corresponds to physical zone 316. Devices detecting Bluetooth signals from beacon 306 are determined to be within physical zone 316. Beacon 308 corresponds to physical zone 318. Devices detecting Bluetooth signals from beacon 308 are determined to be within physical zone 318. The warehouse also includes open space 320 where no BLE beacons are installed. The open space may be used, for example, for loading and unloading large shipments, making it unsuitable for installation of BLE beacons.

Referring now to FIG. 3B, an employee's smartphone 330 detects Bluetooth signals from beacon 308. A location engine determines that the smartphone 330 is located in physical zone 318 because physical zone 318 corresponds to the beacon 308. At a later time (illustrated in FIG. 3C), the employee is packaging products for shipment in the open space 320. While the employee is packaging products for shipment in the open space 320, the employee's smartphone 330 does not detect Bluetooth signals from any of the beacons in the warehouse. The last physical zone in which the smartphone 330 was detected is zone 318. The cell phone (e.g. via a cellular connection or a Wi-Fi connection) transmits trajectory data, to a location engine, for a time period subsequent to a time when the smartphone 330 was detected in zone 318. The trajectory data indicates that the cell phone was moved thirty meters in a Northeast direction subsequent to detection of the smartphone 330 in zone 318. The location engine determines that the smartphone 330 is located in the open space 320 by applying the trajectory (thirty meters northeast) to the last known physical zone (zone 318). Using a map of the warehouse, the location engine determines that the trajectory of the smartphone 330 from zone 318 would result in the smartphone 330 being located in the open space 320.

C. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

D. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 440 might transmit a requested code for an application program through Internet 428, ISP 426, local network 422 and communication interface 418.

The received code may be executed by processor 404 as it is received, and/or stored in storage device 410, or other non-volatile storage for later execution. In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A non-transitory computer readable medium comprising instructions which, when executed by one or more hardware processors, causes performance of operations comprising:
   configuring a plurality of Bluetooth Low Energy (BLE) beacons, associated with each of a plurality of physical zones, to (a) provide Bluetooth signal coverage within the plurality of physical zones and (b) not provide Bluetooth signal coverage in between at least two of the plurality of physical zones;
   determining that a wireless device is not located within any of the plurality of physical zones;
   responsive to determining that the wireless device is not located within any of the plurality of physical zones:
   identifying a last physical zone, of the plurality of physical zones, in which the wireless device was detected;
   identifying a trajectory of the wireless device subsequent to detection of the wireless device in the last physical zone;
   based on the last physical zone and the trajectory, estimating a current location of the wireless device.

2. The medium of claim 1, wherein detecting the wireless device in the particular physical zone comprises the wireless device detecting Bluetooth signals from one or more BLE beacons, of the plurality of BLE beacons, corresponding to the particular physical zone.

3. The medium of claim 1, wherein other physical zones, that are (a) without corresponding BLE beacons and (b) in a same physical environment as the plurality of physical zones, are not included in said plurality of physical zones.

4. The medium of claim 1, wherein the operations further comprise adjusting a size of the plurality of physical zones by adjusting a transmit power of one or more BLE beacons in the plurality of BLE beacons.

5. The medium of claim 1, wherein determining that the wireless device is not located within any of the plurality of physical zones comprises determining that the wireless device did not receive Bluetooth signals from any of the plurality of Bluetooth beacons corresponding to any of the plurality of physical zones.

6. The medium of claim 1, wherein determining that the wireless device is not located within any of the plurality of physical zones comprises determining that the wireless device did not receive Bluetooth signals, with a received signal strength above a threshold value, from any of the plurality of Bluetooth beacons corresponding to any of the plurality of physical zones.

7. The medium of claim 1, wherein determining that the wireless device is not located within any of the plurality of physical zones comprises determining that signals received by the wireless device do not match a signature associated with any of the plurality of physical zones.

8. The medium of claim 1, wherein the estimating operation is performed by the wireless device.

9. The medium of claim 1, wherein the trajectory comprises a direction of movement of the wireless device subsequent to detection of the wireless device in the last physical zone.

10. The medium of claim 1, wherein the trajectory comprises a distance of movement of the wireless device subsequent to detection of the wireless device in the last physical zone.

11. The medium of claim 1, wherein the trajectory comprises both (a) a direction of movement of the wireless device and (b) a distance of movement of the wireless device subsequent to detection of the wireless device in the last physical zone.

12. The medium of claim 1, wherein estimating the current location is further based on physical environment information.

13. The medium of claim 1, wherein the current location is estimated in relation to features of a physical environment in which the wireless device is located.

14. The medium of claim 1, wherein estimating the current location is further based on (a) determining that a path exists, within a physical environment of the wireless device, from the last physical zone to the current location and (b) the path is associated with the trajectory of the wireless device subsequent to detection in the last physical zone.

15. The medium of claim 1, wherein the operations further comprise updating a route for a user of the wireless device based on the current location of the wireless device.

16. The medium of claim 1, wherein identifying the trajectory of the wireless device comprises querying the wireless device for the trajectory.

17. The medium of claim 1,
   wherein detecting the wireless device in the particular physical zone comprises one or more BLE beacons in the plurality of BLE beacons, corresponding to the particular physical zone, detecting the wireless device;
   wherein other physical zones, that are (a) without corresponding BLE beacons and (b) in a same physical environment as the plurality of physical zones, are not included in said plurality of physical zones;
   wherein the operations further comprise adjusting a size of the plurality of physical zones by adjusting a transmit power of one or more BLE beacons in the plurality of BLE beacons;
   wherein determining that the wireless device is not located within any of the plurality of physical zones comprises determining that none of the plurality of Bluetooth beacons, corresponding to any of the plurality of physical zones, detect the wireless device within a respective physical zone of the plurality of physical zones;
   wherein determining that the wireless device is not located within any of the plurality of physical zones comprises determining that none of the plurality of Bluetooth beacons, corresponding to any of the plurality of physical zones, detect Bluetooth signals from the wireless device with a received signal strength above a threshold values;
   wherein determining that the wireless device is not located within any of the plurality of physical zones comprises determining that signals received by the wireless device do not match a signature associated with any of the plurality of physical zones;
   wherein determining that the wireless device is not located within any of the plurality of physical zones comprises determining that signals received from the wireless device do not match a signature associated with any of the plurality of physical zones;

wherein the trajectory comprises (a) a direction of movement of the wireless device and (b) a distance of movement of the wireless device subsequent to detection of the wireless device in the last physical zone;

wherein estimating the current location is further based on physical environment information;

wherein the current location is estimated in relation to features of a physical environment in which the wireless device is located;

wherein estimating the current location is further based on (a) determining that a path exists, within a physical environment of the wireless device, from the last physical zone to the current location and (b) the path is associated with the trajectory of the wireless device subsequent to detection in the last physical zone;

wherein the operations further comprise updating a route for a user of the wireless device based on the current location of the wireless device;

wherein identifying the trajectory of the wireless device comprises querying the wireless device for the trajectory.

18. A method comprising:

configuring a plurality of Bluetooth Low Energy (BLE) beacons, associated with each of a plurality of physical zones, to (a) provide Bluetooth signal coverage within the plurality of physical zones and (b) not provide Bluetooth signal coverage in between at least two of the plurality of physical zones;

determining that a wireless device is not located within any of the plurality of physical zones;

responsive to determining that the wireless device is not located within any of the plurality of physical zones:

identifying a last physical zone, of the plurality of physical zones, in which the wireless device was detected;

identifying a trajectory of the wireless device subsequent to detection of the wireless device in the last physical zone;

based on the last physical zone and the trajectory, estimating a current location of the wireless device;

wherein the method is performed by at least on device including a hardware processor.

19. A system comprising:

at least one device including a hardware processor;

the system being configured to perform operations comprising:

configuring a plurality of Bluetooth Low Energy (BLE) beacons, associated with each of a plurality of physical zones, to (a) provide Bluetooth signal coverage within the plurality of physical zones and (b) not provide Bluetooth signal coverage in between at least two of the plurality of physical zones;

determining that a wireless device is not located within any of the plurality of physical zones;

responsive to determining that the wireless device is not located within any of the plurality of physical zones:

identifying a last physical zone, of the plurality of physical zones, in which the wireless device was detected;

identifying a trajectory of the wireless device subsequent to detection of the wireless device in the last physical zone;

based on the last physical zone and the trajectory, estimating a current location of the wireless device.

* * * * *